United States Patent
Nakagawa

[11] Patent Number: 6,123,817
[45] Date of Patent: Sep. 26, 2000

[54] PROBE OF SCANNING ELECTROCHEMICAL MICROSCOPE

[75] Inventor: Tohru Nakagawa, Kusatsu, Japan

[73] Assignee: Matsushita Electric Industrial Co., Ltd., Osaka, Japan

[21] Appl. No.: 08/284,982

[22] Filed: Aug. 4, 1994

Related U.S. Application Data

[63] Continuation of application No. 07/943,476, Sep. 11, 1992, abandoned.

[30] Foreign Application Priority Data

Sep. 27, 1991 [JP] Japan .................................... 3-249208

[51] Int. Cl.[7] ................................................... G01N 27/26
[52] U.S. Cl. ...................... 204/400; 204/416; 204/418; 204/434; 205/790.5; 427/117
[58] Field of Search ................. 204/153.1, 400, 204/416, 418, 419, 434

[56] References Cited

U.S. PATENT DOCUMENTS 4,959,130  9/1990  Josowicz et al. ...................... 204/416

FOREIGN PATENT DOCUMENTS

| | | |
|---|---|---|
| 0 318 289 | 11/1988 | European Pat. Off. . |
| 0 498 339 | 2/1992 | European Pat. Off. . |
| 0 511 662 | 11/1992 | European Pat. Off. . |

OTHER PUBLICATIONS

Hackh's (4th edition) Chemical Dictionary, 1969, month unavailable, p. 611.
K. Tamura; "Plastic Zairyo Koza 6: Keiso Jyushi", *Nikkan Kogyo Shinbun Sha*, (Oct. 30, 1962) pp. 79–31.
T. Nakagawa et al; "Atomic Force Microscope Images of Monolayers from Alkyltricholorosilane . . .", *Langmuir*, vol. 10, No. 2, pp. 525–529.
R. Guckenberger et al.; "A Scanning Tunneling Microscope (STM) for Biological Applications: Design and Performance", *Ultramicroscopy* 25 (1988 month unavailable) pp. 111–121.
S. Wasserman et al.; "The Structure of Self–Assembled Monolayers of Alkylsiloxanes on Silicon: A Comparison of Results from Ellipsometry . . .", *J. Am. Chem. Soc.* 1989 month unavailable, 111, pp. 5852–5861.
Derwent Abstract of EP 383584.
Patent Abstracts of Japan, vol. 014, No. 498 (P–1124) Oct. 30, 1990 & JP–A–22 03 260 (Seiko Instruments Inc.) Aug. 13, 1990.
Analytical Chemistry, vol. 61, No. 2, Jan. 15, 1989, Columbus US, pp. 132–138, A. J. Bard et al., "Scanning Electrochemical Microscopy. Introduction and Principles".
Analytical Chemistry, vol. 60, No. 8, Apr. 15, 1988, Columbus US, pp. 751–758, FU–REN F. Fan; A. J. Bard, "Scanning Tunneling Microscopic Studies of Platinum Electrode Surfaces".

*Primary Examiner*—T. Tung
*Attorney, Agent, or Firm*—Morrison & Foerster LLP

[57] ABSTRACT

This invention concerns a scanning electrochemical microscope prove capable of measuring a specimen which does not have a smooth surface. The probe is insulated by a monomolecular adsorption film, a monomolecular laminated film, or polymer film (i.e., organic thin film). Its front end has the organic thin film removed by an electric field evaporation process to expose the metal wire, and the current is detected by this portion. Active hydrogen is present on the surface of the metal wire which preferably has a pointed end. A silane surfactant such as octadecyl trichlorosilane or the like is brought into contact with the metal wire surface to cause a dehydrochlorination reaction, thereby forming a monomolecular film, a monomolecular laminated film, or polymer film which is chemically adsorbed by colvant siloxane bonds to the surface of the metal. Only the front end portion of the metal wire is evaporated by the electric field, so that a probe with a very fine tip is obtained.

3 Claims, 4 Drawing Sheets

FIG. 4
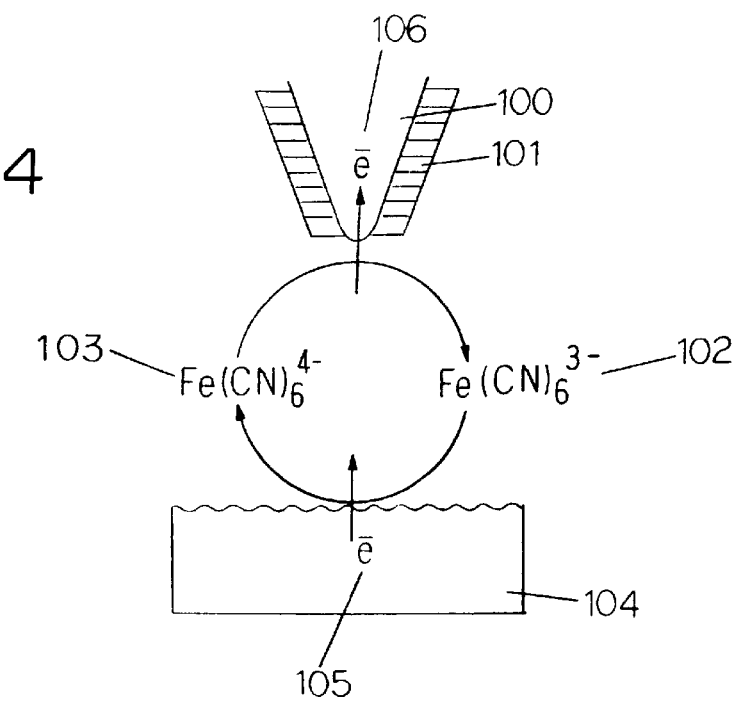
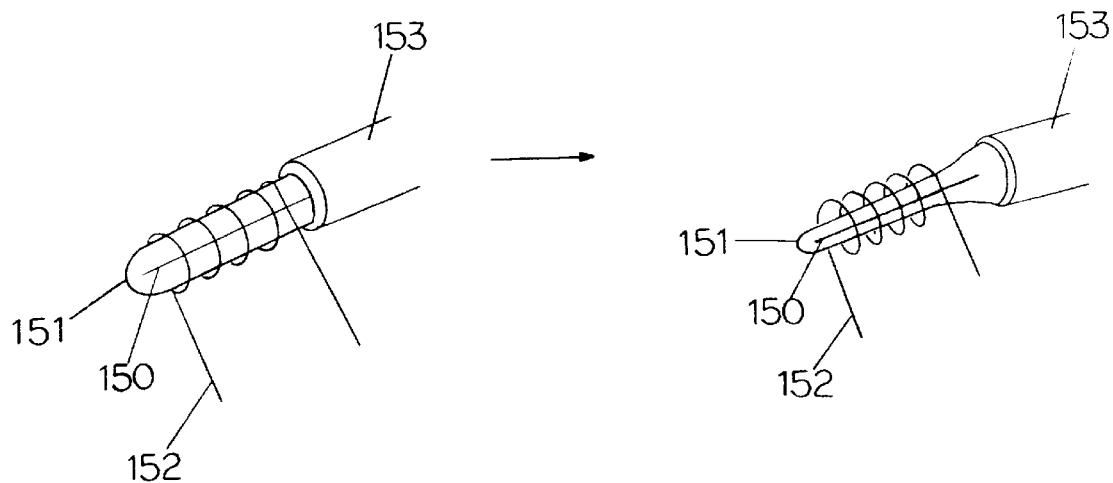
FIG. 5(a)
PRIOR ART
FIG. 5(b)
PRIOR ART

PROBE OF SCANNING ELECTROCHEMICAL MICROSCOPE

This application is a continuation of U.S. application Ser. No. 07/943,476, filed Sep. 11, 1992, now abandoned.

FIELD OF THE INVENTION

This invention relates to a scanning electrochemical microscope probe and a method of manufacturing the same, and more particularly to a scanning electrochemical microscope probe having a very fine pointed end capable of measuring a surface sample which is not smooth, and a method of manufacturing the same.

BACKGROUND OF THE INVENTION

A scanning electrochemical microscope probe may be fabricated as in a method proposed by Allen J. Bard et al. (Anal. Chem. 61, 1989, page 132). The detail is explained below by reference to FIG. 5.

A platinum wire 150 of several microns in diameter is put in a glass tube 151 of 1 mm in inside diameter closed at one end, and the other end of the glass tube is connected to a vacuum pump 153 to evacuate the tube. A heater wire 152 is wound around the glass tube 151, and the glass tube is melted and the platinum wire is sealed in (FIGS. 5(a), (b)). Afterwards, the front end of the glass tube 151 is polished with sandpaper and diamond paste until the platinum wire 151 is exposed to the surface (FIG. 6). Then the glass wall 151 around the platinum wire 150 is polished with emery paper (product number Grit 600 manufactured by Buehler Ltd.) and diamond paste to sharpen the end of the glass tube (FIG. 7). In this manner, the scanning electrochemical microscope probe is fabricated.

The scanning electrochemical microscope probe fabricated in the conventional process consists of a platinum wire which is a metal wire for detecting the current, and a glass tube for insulating it electrically. The outside diameter and wall thickness of the glass tube should be preferably as small as possible, but it is difficult to manufacture to a size of scores of microns or less. Therefore, the shape of the probe is determined by the shape of the glass in which the platinum wire is sealed. To sharpen the end of the probe, the glass is polished mechanically, but it is difficult to control the radius of curvature of the end of the probe within several microns by this method.

Therefore, as shown in FIG. 8, when the probe of the scanning electrochemical microscope manufactured in the conventional method is brought close to a specimen 154 of which surface is not smooth, the glass wall 151 around the platinum wire first touches the specimen 154, and the probe cannot be brought very close to the specimen, and the resolution of the specimen observation is poor.

SUMMARY OF THE INVENTION

It is hence a primary object of the invention to present a scanning electrochemical microscope probe having a pointed end capable of measuring a specimen surface at a micron level of accuracy, and a method of manufacturing the same.

To achieve the above object, the scanning electrochemical microscope probe of the invention is a scanning electrochemical microscope probe comprising a metal wire having a body and a front end, wherein the body of the metal wire is covered with an organic thin film and the organic thin film is a chemical adsorption film comprising an alkyl group or an alkyl fluoride group bonded to the body of the metal wire by covalent siloxane bonds, and wherein the front end of the metal wire is an exposed metal surface.

It is preferable in this invention that the chemical adsorption film is selected from the group consisting of a monomolecular film, a monomolecular laminated film, and a polymer film.

It is preferable in this invention that the metal wire is selected from the group consisting of a tungsten wire, platinum wire, and an alloy of platinum.

Another object of the invention is to provide a method of manufacturing a scanning electrochemical microscope probe comprising
(a) providing a metal wire having active hydrogen present on a surface of the metal wire,
(b) contacting the metal wire with a silane surfactant containing alkyl groups or alkyl fluoride groups to cause a dehydrochlorination reaction and form a chemically adsorbed film by forming covalent siloxane bonds, and
(c) evaporating a front end portion of the metal wire by applying an electric field.

A further object of the invention is to provide a method of manufacturing a scanning electrochemical microscope probe comprising
(a) providing a metal wire having active hydrogen present on a surface of the metal wire with,
(b) contacting the metal wire a silane surfactant containing alkyl groups or alkyl fluoride groups to cause a dehydrochlorination reaction and form a chemically adsorbed film by forming covalent siloxane bonds, and
(c) removing a front end portion of the metal wire by rubbing the front end portion against a solid surface.

According to the invention, the probe is insulated by a monomolecular adsorption film, a laminated film, a polymer film (i.e., an organic thin film). Its front end is removed from the organic thin film by electric field evaporation, the metal wire is exposed, and the current is detected by this portion. The film thickness of the organic thin film covering the probe may be defined to a level of several nanometers or less, and the shape of the probe is not determined by the shape of a glass tube unlike the prior art. Therefore, by fabricating a probe in this method by using a metal wire of which the radius of curvature of the front end is several microns or less, it is possible to obtain a scanning electrochemical microscope probe capable of measuring a specimen having a rough surface; for example, having bumps of about several microns in radius on the surface.

Also according to the manufacturing method of the invention, the scanning electrochemical microscope probe of the invention may be manufactured efficiently.

BRIEF DESCRIPTION OF THE DRAWINGS

FIG. 4 is an explanatory diagram showing the principle of operation of an electrochemical microscope used in one embodiment of the invention.

FIG. 5a) and FIG. 5(b) are process diagrams showing the process of manufacturing a scanning electrochemical microscope probe in the prior art.

DETAILED DESCRIPTION OF THE INVENTION

Figure 1:
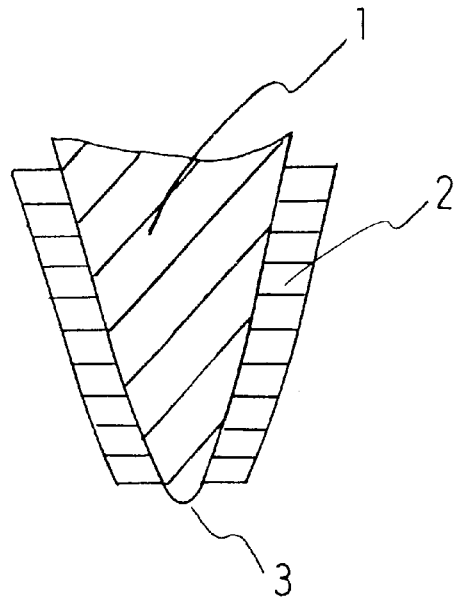
FIG. 1 is a schematic sectional view of a scanning electrochemical microscope probe fabricated in one embodiment of the invention.

Referring now to the drawings, a method of manufacturing the scanning electrochemical microscope probe in one embodiment of the invention is described in detail below.

As a silane surfactant containing alkyl groups used in the invention, examples may include a trichlorosilane chemical adsorbent such as $CH_3(CH_2)_nSiCl_3$, a dichlorosilane chemical adsorbent such as $CH_3(CH_2)_nSiCl_2CH_3$, $CH_3(CH_2)_nSiCl_2C_2H_5$, and monochlorosilane chemical adsorbent such as $CH_3(CH_2)_nSiCl(CH_3)_2$, $CH_3(CH_2)_nSiCl(C_2H_5)_2$ (where, n represent between 0 to 25, or more preferably 10 to 20). In particular, among them, the trichlorosilane chemical adsorbent forms a more rigid chemical adsorption film because the siloxane coupling is formed by the probe surface and adjacent molecules.

According to the invention, a method of manufacturing a chemically adsorbed monomolecular film by a dehydrohalogenation reaction is brought about by contacting a substrate having hydrophilic groups at the surface with a non-aqueous organic solvent containing a compound having a halogen-based functional group able to react with the hydrophilic groups. A basic compound is present in the non-aqueous organic solvent.

The invention is suitably carried out by preparing a non-aqueous organic solvent containing molecules having functional groups able to react with hydrophilic groups; and dipping a substrate containing hydrophilic groups at the surface in the solvent.

The surface active material capable of use according to the invention contains a functional group able to chemically react with a hydrophilic group. Examples of the functional groups are chlorosilyl ($-SiCl_nX_{3-n}$) groups, where n represents 1, 2 or 3, X represents a hydrogen atom or a substituted group such as a lower-alkyl or lower-alkoxyl group, and other molecules containing active chlorine. The other end of the molecule may contain an organic group such as an alkyl, cycloalkyl or allyl group, for example a compound having a fluorocarbon group.

Examples of the chlorosilane-based surface active material containing an alkyl fluoride group are trichlorosilane-based surface active materials such as $CF_3(CF_2)_7(CH_2)_2SiCl_3$,
$CF_3(CH_2)_2O(CH_2)_{15}SiCl_3$,
$CF_3(CH_2)_2Si(CH_3)_2(CH_2)_{15}SiCl_3$,
$F(CF_2)_4(CH_2)_2Si(CH_3)_2(CH_2)_9SiCl_3$,
$CF_3COO(CH_2)_{15}SiCl_3$,
$CF_3(CF_2)_5(CH_2)_2SiCl_3$,
$F(CF_2)_8(CH_2)_2Si(CH_3)_2(CH_2)_9SiCl_3$, and lower-alkyl group substituted monochlorosilane- or dichlorosilane-based surface active materials such as $CF_3(CF_2)_7(CH_2)_2SiCl_n(CH_3)_{3-n}$,
$CF_3(CF_2)_7(CH_2)_2SiCl_n(C_2H_5)_{3-n}$,
$CF_3CH_2O(CH_2)_{15}SiCl_n(CH_3)_{3-n}$,
$CF_3CH_2O(CH_2)_{15}SiCl_n(C_2H_5)_{3-n}$,
$CF_3(CH_2)_2Si(CH_3)_2(CH_2)_{15}SiCl_n(CH_3)_{3-n}$,
$CF_3(CF_2)_3(CH_2)_2Si(CH_3)_2(CH_2)_9SiCl_n(C_2H_5)_{3-n}$,
$CF_3(CF_2)_7(CH_2)_2Si(CH_3)_2(CH_2)_9SiCl_n(CH_3)_{3-n}$,
$CF_3COO(CH_2)_{15}SiCl_n(CH_3)_{3-n}$, and
$CF_3(CF_2)_5(CH_2)_2SiCl_n(CH_3)_{3-n}$ (where n represents 1 or 2).

Among these materials, trichlorosilane-based surface active materials are particularly suitable. This is so because chlorosilyl bonds other than those bonded to their hydrophilic groups form inter-molecular bonds between adjacent chlorosilane and siloxane bonds, thus permitting formation of a stronger chemically adsorbed film. Further,

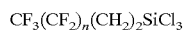

$$CF_3(CF_2)_n(CH_2)_2SiCl_3$$

where n represents an integer most suitably ranging from about 3 to about 25, is suitable because the compounds are soluble in solvents, are able to be chemically adsorbed and are water-repelling, oil-repelling, and anti-contaminating. Further, by incorporating an ethylene or acetylene group in an alkyl fluoride chain portion, the chemically adsorbed film can be crosslinked after its formation by irradiating with an electron beam of 5 Mrad. to further improve hardness.

According to the invention, any substrate may be used which contains $-OH$, $-COOH$, $-NH_2$, $>NH$ or other hydrophilic groups at its surface. Examples of these materials are various metals such as tungsten, platinum, aluminum, iron, stainless steel and titanium.

According to the invention, the substrate containing hydrophilic groups at the surface may be contacted with the non-aqueous organic solvent by any suitable means, e.g., dipping, spraying, brushing, blowing and spin coating.

It is preferred that the concentration of the chemical adsorbing material solution is about $10^{-4}$ mol/l or above, more preferably $10^{-3}$ mol/l or above. The most preferred upper limit is $10^{-1}$ mol/l.

To form only a single chemically adsorbed monomolecular film according to the invention, it is necessary to carry out after the monomolecular film formation step a washing step, in which unreacted molecules remaining on the monomolecular film are washed away without water. As a method of washing, ultrasonic waves can be applied to a washing solution, or by continuous over-flow of the washing solution, or by renewing the washing solution several times.

A method of manufacturing a laminated chemically adsorbed film comprises a chemical adsorption step of contacting a hydrophilic substrate with a non-aqueous solution containing a surface active material, having an adsorption site molecular group at one end and a reaction site molecular group at another end; a monomolecular layer formation step of washing non-adsorbed surface active material away from the hydrophilic substrate using a non-aqueous solution subsequent to the chemical adsorption step; and a reaction step of contacting the hydrophilic substrate after the monomolecular layer formation step with a solution containing molecules having a specific function to cause a reaction between the reaction site molecular group of the surface active material and the molecules having the specific function.

The non-aqueous solvent to be used according to the invention may be any organic solvent, which does not dissolve the plastic material with the chemically adsorbed film to be formed thereon and is free from active hydrogen able to react with the chlorosilane-based surface active material. Suitable examples of the solvent are fluorine-based solvents, e.g., 1,1-dichloro- 1-fluoroethane, 1,1-dichloro-2,2,2-trifluoroethane, 1,1-dichloro-2,2,3,3,3- pentafluoropropane, 1,3-dichloro-1,1,2,2,3-heptafluoropropane, etc., hydrocarbon-based solvents, e.g., hexane, octane, hexadecane, cyclohexane, etc., ether-based solvents, e.g., dibutylether, dibenzylether, etc., and ester-based solvents, e.g., methyl acetate, ethyl acetate, isopropyl acetate, amyl acetate, etc.

The chemical adsorption film of the invention is formed on the metal wire having a pointed end. The invention functions sufficiently having only a single layer of monomolecular chemical adsorption film. To form the monomolecular chemical adsorption film with a single layer, chlorosilane surfactant is dissolved in a non-aqueous organic solvent, a metal wire is immersed and the surfactant is chemically adsorbed. The dipped wire is cleaned in non-aqueous solvent without contact with moisture, and it is done easily without using any particular process.

Of course, chemical adsorption films may be laminated. In this case, the operation is as follows. A chemical adsorbent having halosilyl groups at both ends of the molecule, for example, $Cl_3Si(CH_2)_2(CF_2)_6(CH_2)_2SiCl_3$ is dissolved in a non-aqueous solvent, the metal wire is brought to contact therewith, cleaned in non-aqueous solvent, and cleaned in water. By repeating this process, monomolecules are accumulated to form a laminated film.

It is also possible to form a polymer-form chemical adsorption film. In this case, after adsorbing the chlorosilane chemical adsorption film on the metal wire, it is cleaned in a solvent containing moisture, such as ethanol.

The electric field evaporation employed in the invention is a method of popping out the atoms in a substance outside the surface as ions, by applying a strong electric field to the surface of the substance. When the metal wire having pointed end is brought closer to the conductor with a flat surface, and a proper potential difference is given between the metal wire and conductor, the electric field is concentrated at the front end of the metal wire, and atoms in this portion only pop out. Therefore, after forming a chemical adsorption film possessing alkyl groups or alkyl fluoride groups on the surface of metal wire having a pointed end through siloxane bonding (coupling), only the front end portion of the metal wire is evaporated by the electric field, thereby fabricating a probe of scanning electrochemical microscope probe having an exposed front end.

Aside from this, after forming a chemical adsorption film possessing alkyl groups or alkyl fluoride groups on the surface of a metal wire having a pointed end through siloxane coupling, the front end portion of the metal wire is rubbed against the surface of an individual element, thereby fabricating a scanning electrochemical microscope probe having an exposed front end.

The invention is described more specifically by referring to practical embodiments below.

Embodiment 1

One end of a tungsten wire of 0.2 mm in diameter and 10 mm in length was sharpened by an electrolytic polishing method. The procedure of electrolytic polishing was as follows.

Figure 2:
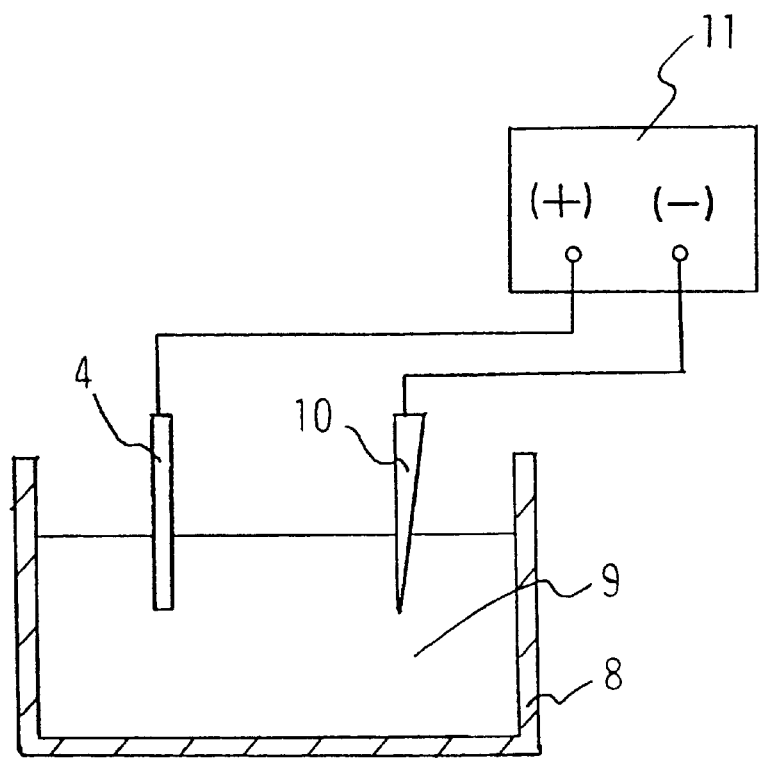
FIG. 2 is an explanatory diagram showing a method of the manufacturing method of probe by electrolytic polishing in one embodiment of the invention.

As shown in FIG. 2, a tungsten wire 4 and a platinum wire 10 are immersed in a sodium nitrite aqueous solution 9 (20 g/100 ml $H_2O$), and a voltage of 30 V is applied between the two metal wires so that the potential may be positive on the tungsten wire by means of a voltage generator 11. The tungsten wire is immersed about 1 mm so as to be vertical to the liquid surface. The voltage is applied continuously until bubbles or flashes light are no longer released from the tungsten wire. Afterwards, the tungsten wire is taken out of the sodium nitrite solution, and washed in purified water for 5 seconds, and in ethanol for 5 seconds.

This tungsten wire was immersed for 1 hour in a solution in which octadecyltrichlorosilane (OTS) 30 mM was dissolved as a silane surfactant (silane coupling agent) (as the solution, a mixture of 80 vol. % normal hexadecane, 12 vol. % carbon tetrachloride, and 8 vol. % chloroform was used), and cleaned in chloroform and then cleaned in purified water. After this treatment, the tungsten wire became water-repellent, and it was confirmed that the tungsten wire was coated with a monomolecular film of OTS.

In this procedure, the dehydrochlorination reaction between the hydroxyl groups (—OH) on the surface of tungsten wire and the OTS proceeds as in Formula [1].

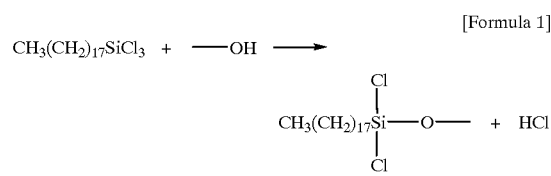

[Formula 1]

When subsequently cleaned in chloroform, the unreacted OTS remaining on the surface of the tungsten wire is removed. When cleaned in water in succession, the chloro groups (—Cl) in Formula [1] are hydrolyzed, and silanol groups (—SiOH) are formed. This reaction is shown in Formula [2].

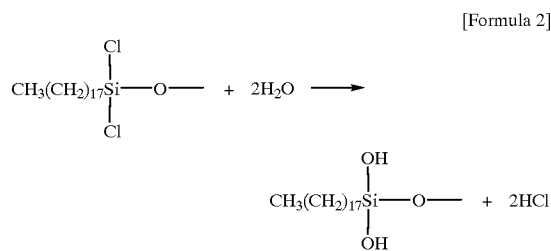

[Formula 2]

In the next step, the silanol groups (—SiOH) induce a dehydration condensation reaction in cooperation with adjacent silanol groups, and are crosslinked by siloxane coupling (—SiO—). This process is shown in Formula [3].

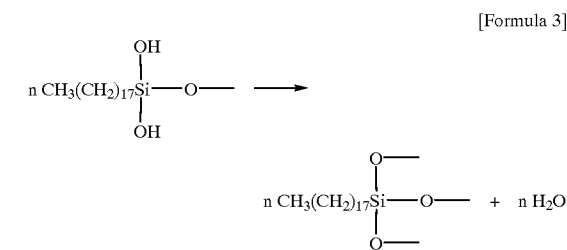

[Formula 3]

(where n is a natural number of 1 or more.)

In this way, the monomolecular film is formed.

The front end portion of this tungsten wire is brought closer, about several millimeters, to a flat platinum plate electrode, and a voltage of 200 V is applied for several milliseconds between the tungsten wire and platinum plate electrode so that the tungsten wire may have a negative potential. By this operation, the tungsten atoms in the front end portion of the tungsten wire are evaporated by the electric field, and at the same time the OTS in this portion is completely eliminated. As a result of observation of the front end portion of the tungsten wire by scanning electron microscope, it has been known that the film of OTS is removed in a range of several nanometers in diameter.

A schematic sectional view of this probe is shown in FIG. 1. In FIG. 1, numeral 1 denotes a tungsten wire, 2 is a monomolecular adsorption film, and 3 is a portion evaporated by an electric field in the front end part of the tungsten wire.

In this operation, the scanning electrochemical microscope probe is fabricated.

Using this probe, the surface shape of a platinum plate was observed. The platinum plated used in the test was 10 mm square and 0.5 mm thick, and the surface was roughened by polishing with carbon paste of 1 micron ($\mu$m).

Figure 3:
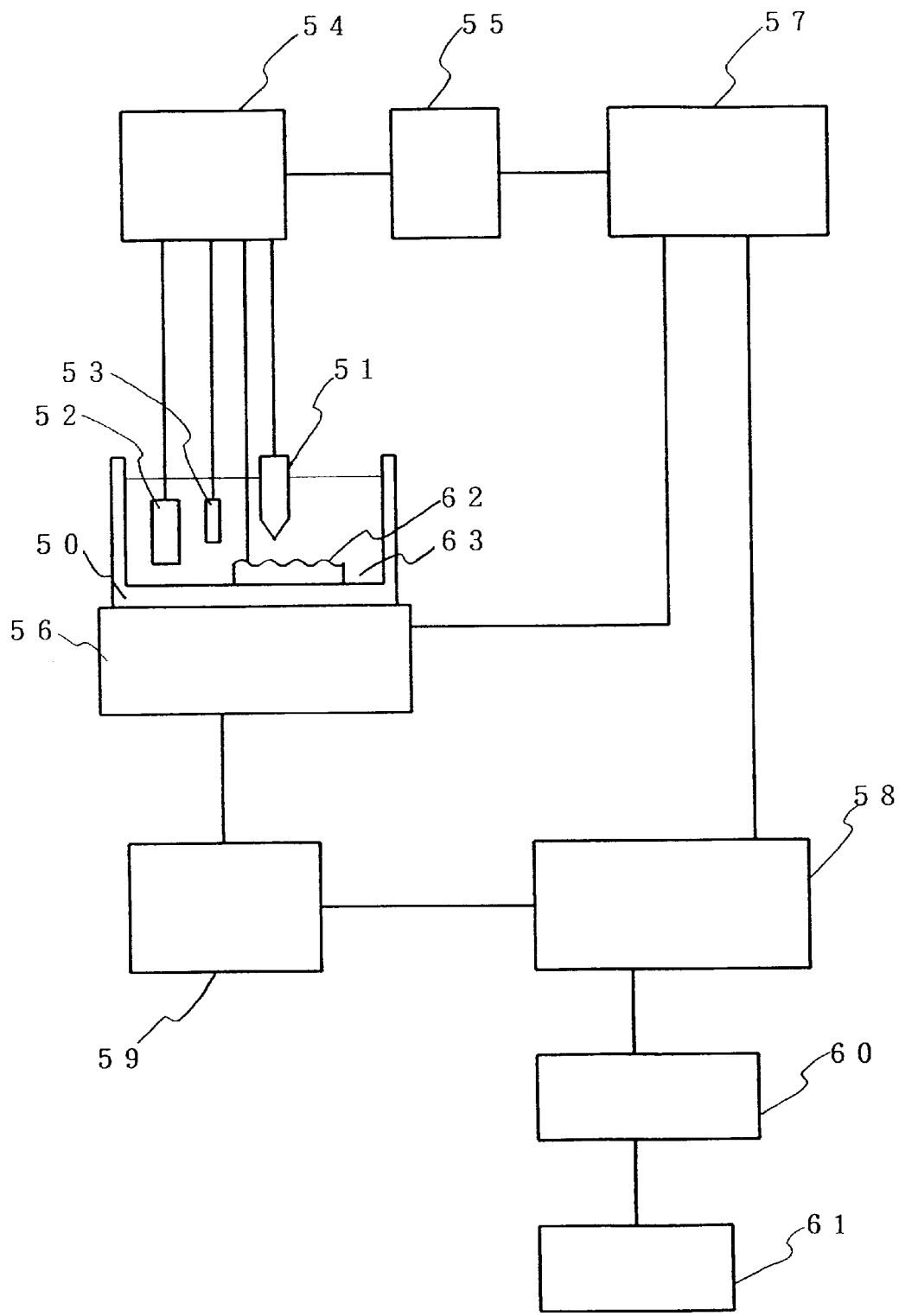
FIG. 3 is an explanatory diagram showing a schematic view of a scanning electrochemical microscope used in one embodiment of the invention.
Figure 6:
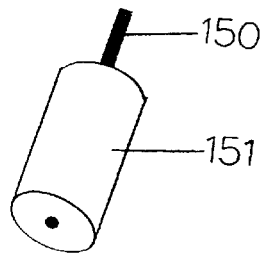
FIG. 6 is a scanning electrochemical microscope probe in the prior art.
Figure 7:
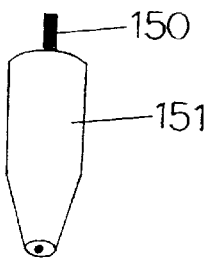
FIG. 7 is a scanning electrochemical microscope probe in the prior art.
Figure 8:
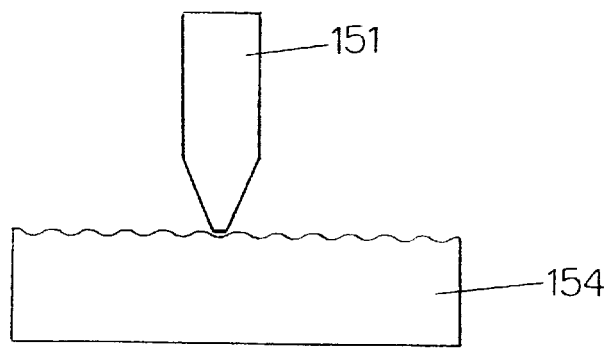
FIG. 8 is an explanatory diagram showing a mode of operation of a scanning electrochemical microscope probe manufactured by a conventional method in conjunction with an uneven specimen surface.

FIG. 3 shows the schematic diagram of the scanning electrochemical microscope used in the experiment. Numeral 62 is a specimen measured, and 63 is an electrolyte, in which 1 mM of $K_4Fe(CN)_6$ is dissolved in an aqueous solution of 0.2 M of $Na_2SO_4$.

Numeral 50 is a cell, 51 is a probe acting as a working electrode; 52 is a counter electrode, which is a platinum plate electrode in this case; 53 is a reference electrode for determining the potential of the working electrode and the platinum plate which is the specimen to be measured, which is a silver, silver chloride electrode in this embodiment; 54 is a potentiostat for setting the potential to be applied to the probe and the reference electrode of the specimen to be measured; 55 is a current detector for detecting the current flowing between the probe and the counter electrode; and 56 is a piezoelectric scanner for scanning the specimen to be measured at an atomic level of precision, which is constructed so as to be expanded and contracted by an electric signal (voltage) to move in three-dimensional directions; that is, the Z-axis direction for moving the specimen up and down, the Y-axis direction for moving the specimen forward and backward in the drawing, and the X-axis direction for moving the specimen in the lateral direction in the drawing. Numeral 57 denotes a control circuit in the Z-axis direction of the specimen; 58 is a memory device of the X-, Y-, Z-axis direction for storing the result of inspection of specimen; 59 is an X-Y direction scanning circuit for controlling the signal for scanning the specimen within a set range; 60 is a data analyzer; and 61 is a display. The potential to the reference electrode of the specimen was set at 0.2 V, and the potential of the probe, 0.3 V.

As shown in FIG. 4, in this state, Fe $(CN)_6^{3-}$ ion 102 is reduced on the specimen surface 104 to Fe $(CN)_6^{4-}$ 103, and it is diffused on to the probe surface 100, where it is oxidized to become Fe $(CN)_6^{3-}$ ion 102 again, and a oxidizing current 106 flows in the probe 100 at this time. The closer the distance between the probe 100 and specimen 104, the faster the mutual conversion rate of the reducing element and oxidizing element, and the higher the concentration of the reducing element near the probe, so that the oxidizing current becomes larger. Therefore, there is a correlation between the magnitude of the oxidizing current flowing in the probe, and the distance of the probe and specimen. In this embodiment, the surface shape of the specimen was measured by scanning the probe in the X-Y direction while varying the distance of the probe and specimen so that the current flowing in the probe be constant. As a result, the surface shape of the specimen could be observed at a precision of 0.1 micron ($\mu$m), and this result was almost same as the surface shape investigated by the scanning electron microscope.

Embodiment 2

In the same method as in Embodiment 1, the scanning electrochemical microscope probe was prepared. However, the chemical adsorption film formed on the tungsten wire was a polymer film. For this purpose, the tungsten wire having the front end sharpened by polishing in an electric field was immersed for 1 hour in a solution dissolving 30 mM of octadecyl trichlorosilane (OTS) which is a silane surfactant (silane coupling agent) (as the solution a mixture of 80% normal hexane, 12% carbon tetrachloride, and 8% chloroform by volume was used), and was cleaned in ethanol and then in purified water, and a polymer film of OTS was formed on the tungsten wire.

Using this probe, the surface shape of a platinum plate was measured. The platinum plate used in the test was 10 mm square and 0.5 mm thick, and the surface was roughened by polishing with carbon paste of 1 micron ($\mu$m). Same as in Embodiment 1, this platinum plate was observed, and the specimen surface shape could be observed at a precision of 0.1 micron ($\mu$m), and this result was nearly the same as the surface shape investigated by scanning electron microscope.

Embodiment 3

As the metal wire used in Embodiment 1, an alloy of platinum and iridium was used instead of tungsten wire, and a scanning electrochemical microscope probe was prepared in the same method as in Embodiment 1.

Using this probe, the surface shape of a platinum plate was measured. The platinum plate used in the test was 10 mm square and 0.5 mm thick, and the surface was roughened by polishing with carbon paste of 1 micron ($\mu$m). Same as in Embodiment 1, this platinum plate was observed, and the specimen surface shape could be observed at a precision of 0.1 micron ($\mu$m). This result was nearly same as the surface shape investigated by scanning electron microscope.

Embodiment 4

As the metal wire used in Embodiment 2, an alloy of platinum and iridium was used instead of tungsten wire, and a scanning electrochemical microscope probe was prepared in the same method as in Embodiment 1.

Using this probe, the surface shape of a platinum plate was measured. The platinum plate used in the test was 10 mm square and 0.5 mm thick, and the surface was roughened by polishing with carbon paste of 1 micron ($\mu$m). Same as in Embodiment 1, this platinum plate was observed, and the specimen surface shape could be observed at a precision of 0.1 micron ($\mu$m). This result was nearly the same as the surface shape investigated by scanning electron microscope.

Embodiment 5

Same as in Embodiment 1, a chemical adsorption monomolecular film of OTS was formed on a tungsten wire having its front end pointed by polishing by an electric field.

The front end of the metal wire was rubbed against a silicon substrate. The load applied to the metal wire was about 1 mN.

As a result of observation of the shape of the front end of the tungsten wire by scanning electron microscope, it was found that the film of OTS was removed in a range of several nanometers in diameter. Thus, the scanning electrochemical microscope probe was prepared.

Using this probe, the surface shape of a platinum plate was measured. The platinum plate used in the test was 10 mm square and 0.5 mm thick, and the surface was roughened by polishing with carbon paste of 1 micron ($\mu$m). Same as in Embodiment 1, this platinum plate was observed, and the specimen surface shape could be observed at a precision of 0.1 micron (μm). This result was nearly the same as the surface shape investigated by scanning electron microscope.

Embodiment 6

A scanning electrochemical microscope probe was prepared in the same manner as in Embodiment 5. However, the chemical adsorption film formed on the tungsten wire was a polymer film. For this purpose, the tungsten wire having the front end sharpened by polishing in an electric field was immersed for 1 hour in a solution dissolving 30 mM of octadecyl trichlorosilane (OTS) which is a silane surfactant (silane coupling agent) (as the solution a mixture of 80% normal hexane, 12% carbon tetrachloride, and 8% chloroform by volume was used), and was cleaned in ethanol and then in purified water, and a polymer film of OTS was formed on the tungsten wire.

Using this probe, the surface shape of a platinum plate was measured. The platinum plate used in the test was 10 mm square and 0.5 mm thick, and the surface was roughened by polishing with carbon paste of 1 micron (μm). Same as in Embodiment 1, this platinum plate was observed, and the specimen surface shape could be observed at a precision of 0.1 micron (μm). This result was nearly the same as the surface shape investigated by scanning electron microscope.

Embodiment 7

A the wire used in Embodiment 5, an alloy of platinum and iridium was used instead of tungsten wire, and a scanning electrochemical microscope probe was prepared in the same method as in Embodiment 1.

Using this probe, the surface shape of a platinum plate was measured. The platinum plate used in the test was 10 mm square and 0.5 mm thick, and the surface was roughened by polishing with carbon paste of 1 micron (μm). Same as in Embodiment 1, this platinum plate was observed, and the specimen surface shape could be observed at a precision of 0.1 micron (μm). This result was nearly the same as the surface shape investigated by scanning electron microscope.

Embodiment 8

A the wire used in Embodiment 6, an alloy of platinum and iridium was used instead of tungsten wire, and a scanning electrochemical microscope probe was prepared in the same method as in Embodiment 1.

Using this probe, the surface shape of a platinum plate was measured. The platinum plate used in the test was 10 mm square and 0.5 mm thick, and the surface was roughened by polishing with carbon paste of 1 micron (μm). Same as in Embodiment 1, this platinum plate was observed, and the specimen surface shape could be observed at a precision of 0.1 micron (μm). This result was nearly the same as the surface shape investigated by scanning electron microscope.

Thus, by using the scanning electrochemical microscope probe fabricated by the methods in the embodiments herein, specimens which are not smooth in surface, having bumps of several microns (μm) in radius on the surface, were sufficiently observed.

The OTS which is a chemical adsorbent used in the embodiments was right in reactivity, and securely covered the metal wire in a short reaction time, so that probes were prepared at a high yield.

The chemical adsorption film may be also laminated. In this case, the operation is as follows. For example,

$Cl_3Si\,(CH_2)_2(CF_2)_6(CH_2)_2SiCl_3$ having halosilyl groups at both ends of molecule is dissolved in a non-aqueous solvent. It is brought into contact with a metal wire, cleaned in non-aqueous solvent and cleaned in water, and by repeating this process, the monomolecules are accumulated to form a laminated film.

In the foregoing embodiments, OTS was used as the chemical adsorbent, but others may be also used, including compounds possessing other alkyl groups such as alkyl fluoride groups, compounds having other halosilyl groups, and compounds having alkoxy silane groups.

According to the embodiments of the invention, as described herein, the scanning electrochemical microscope probe is fabricated by covering the metal wire with a pointed end with an organic thin film, and removing the film from the front end portion of the metal wire by electrolytic evaporation, or by rubbing the metal wire against a solid surface, and therefore the shape of the probe is determined almost by the shape of the metal wire, and the radius of curvature of the front end of the metal wire may be controlled down to several microns, so that the specimen which are not smooth in surface, having, for examples, bumps of several microns in radius on the surface may be measured precisely.

As explained herein, according to the invention, the probe is insulated by the monomolecular adsorption film or its laminated film, or organic thin film which is a polymer film, and the organic thin film of the front end portion is removed by electric field evaporation or by rubbing the metal wire against a solid surface to expose the metal wire, and the current is detected by this portion. The film thickness of the organic thin film covering the probe is defined below the level of several nanometers, and therefore the shape of the probe is not determined by the shape of the glass tube as experienced in the conventional method. Therefore, by fabricating the probe by this method using a metal wire of which the radius of curvature of the front end is several microns or less, it is possible to fabricate a scanning electrochemical microscope probe capable of measuring a specimen having a rough surface, for example, having bumps of about several microns in radius on the surface.

According to the manufacturing method of the invention, the scanning electrochemical microscope probe may be fabricated efficiently and rationally.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A scanning electrochemical microscope probe comprising a metal wire having a body and a front end, wherein the body of the metal wire is covered with an organic thin film and the organic thin film is a chemical adsorption film comprising an alkyl group or an alkyl fluoride group bonded to the body of the metal wire by covalent siloxane bonds, and wherein the front end of the metal wire is an exposed metal surface.

2. The scanning electrochemical microscope probe according to claim 1, wherein said chemical adsorption film is selected from the group consisting of a monomolecular film, a monomolecular laminated film, and a polymer film.

3. The scanning electrochemical microscope probe according to claim 1 or 2, wherein said metal wire is selected from the group consisting of a tungsten wire, platinum wire, and an alloy of platinum.

* * * * *